Figures 1, 2:
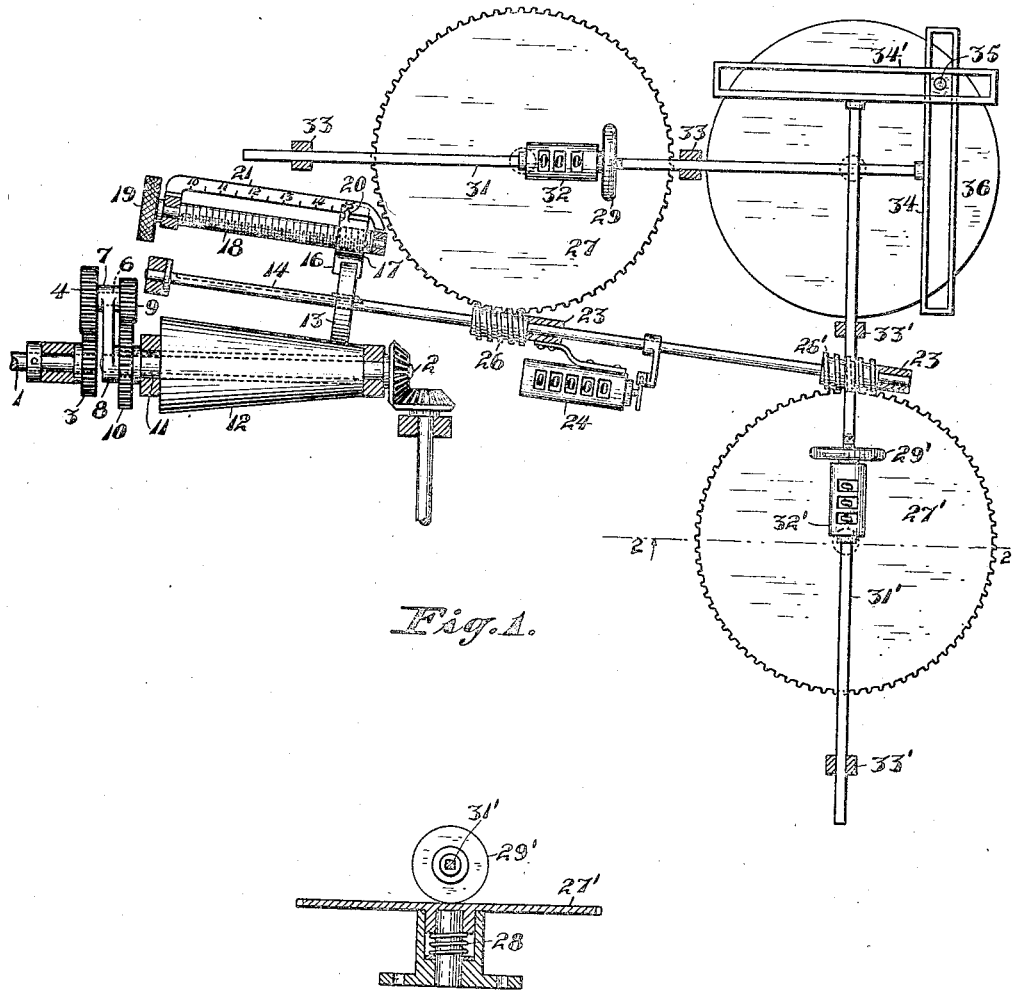

H. M. JENSEN, H. H. J. BENSON & J. W. LEWIS.
MECHANICAL NAVIGATOR.
APPLICATION FILED MAR. 14, 1914.

1,101,128. Patented June 23, 1914.

WITNESSES:
H. C. Fliedner
G. M. Ball

INVENTORS:—
Henry M. Jensen
Howard H. J. Benson
John W. Lewis
BY Francis M. Wright,
ATTORNEY

UNITED STATES PATENT OFFICE.

HENRY M. JENSEN AND HOWARD H. J. BENSON, OF SAN PEDRO, AND JOHN W. LEWIS, OF SAN FRANCISCO, CALIFORNIA.

MECHANICAL NAVIGATOR.

1,101,128.  Specification of Letters Patent.  Patented June 23, 1914.

Application filed March 14, 1914. Serial No. 824,630.

*To all whom it may concern:*

Be it known that we, HENRY M. JENSEN and HOWARD H. J. BENSON, citizens of the United States, and residents of San Pedro, county of Los Angeles, State of California, and JOHN W. LEWIS, a citizen of the United States, and resident of San Francisco, county of San Francisco, State of California, have invented new and useful Improvements in Mechanical Navigators, of which the following is a specification.

The object of the present invention is to provide an automatic position indicator for indicating the direction and distance traveled from a given point by a ship or other mobile object.

In the accompanying drawing, Figure 1 is a plan view of the indicator; Fig. 2 is a detail sectional view on the line 2—2 of Fig. 1.

Referring to the drawing, 1, 2, indicate shafts operatively connected to the port and starboard engine shafts respectively. To the shaft 1 is connected a gear wheel 3 meshing with a gear wheel 4 of equal size on a shaft 6 having its bearings in a sleeve 7, from which extends a crank arm 8 connected to the shaft 2. Upon said shaft 6 is secured a gear wheel 9 meshing with a gear wheel 10 of twice the size, secured to a sleeve 11 around the shaft 2. It will readily be seen that the speed of the sleeve 11 will be directly proportional to the sum of the speeds of the shafts 1 and 2 connected to the port and starboard engine shafts respectively, and would therefore, if there were no slip of said engine shafts, be directly proportional to the speed of the ship. The amount of reduction to be made for slip increases with the speed, and to allow for the slip we provide on the sleeve 11 a cone 12 in contact with which rotates a wheel 13 keyed and slidable on a shaft 14, said wheel being contained in a fork 16 on a threaded sleeve 17 on a screw 18 turned by a milled-head 19 and having a pointer 20 which can travel along an indicating scale 21. By moving said sleeve along said screw to correspond with the speed of the ship, the necessary reduction for slip can be made. The shaft 14 rotates in bearings 23, and to one of said bearings is secured a counter 24, which indicates the total length of the path traveled by the vessel. To said shaft 14 are secured worms 26, 26' which mesh with and rotate worm wheels or turntables 27, 27', the faces of which are, by springs 28, held in frictional contact with wheels 29, 29' on shafts 31, 31', having counters 32, 32', and arranged at right angles to each other and slidable in bearings 33, 33'. At right angles to said shafts and at adjacent ends thereof are slotted arms 34, 34', crossing each other and through both slots extends a pin 35 secured on a repeater compass 36 driven by a motor from any mechanical compass such as the Sperry gyro compass.

It is evident that, with this construction, every motion of the ship will be resolved into motions in two directions at right angles, and, if the device is primarily arranged upon the ship in such a position that, when the ship points due north, the pin 35 is in line with one of the shafts 31, 31', and said shafts are in the longitudinal and transverse direction of the ship, then every motion of the ship will be resolved into its motions in the directions north and south, and east and west. Assuming that this system of gearing be made such that each revolution of the wheel 29 or 29' indicates one-tenth of a mile when said wheel is at its maximum distance from the center of its turn-table and supposing that the ship is headed north at 10 knots, then the wheel 29 is making 100 revolutions per hour. The wheel 29' is on the center of its turn-table, and is making zero revolutions per hour, or, in other words, with the ship heading due north at ten knots, the wheel 29 is counting 100 tenths of miles per hour north latitude, and the wheel 29' is not turning, and therefore is recording zero distance made good to the east. As the ship varies in any degree from true north the wheel 29 is moved in toward the center of its turn-table, and the wheel 29' is moved out from the center of its turn-table. For example, suppose that the course of the ship's head has fallen off 45° from true north, then, by the action of the compass relative to the ship, the wheels 29 and 29' are both moved over their respective turn-tables to the positions shown in the drawing. It is seen that these positions are not half-way between the center and the maximum throw but are at a distance from the center proportional respectively to the sine and cosine of the ship's course, the ship's course being the angle between the ship's head and true north. Therefore the wheel 29 records the distance made good to the north (or south) latitude and the wheel 29' records the distance made good to the east (or west) longitude. No matter in what direction the ship's head swings, the wheels 29, 29' are accurately adjusted on their respective turn tables to record respectively the latitude and longitude made good in miles and tenths of miles.

Instead of moving the turn tables from the main engine as shown, they could be connected and operated by a patent log or any other device for measuring the miles steamed.

The same apparatus with obvious changes, could be applied to other mobile objects, such as railway trains, automobiles, and the like.

We claim:—

1. In combination, a compass, a shaft, means for rotating the shaft with a speed proportionate to the speed of a moving object, counters for indicating the speeds of the object in two directions at right angles to one another, means operated by the aforesaid shaft for actuating said counters, and means actuated by the movement of the compass for varying the rate at which said actuating means actuates said counters.

2. In combination, a compass, a shaft, means for rotating the shaft with a speed proportionate to the speed of a moving object, counters for indicating the speeds of the object in two directions at right angles to one another, frictional means rotated by the shaft and engaging said counters to actuate the same, and means operated by the moving of the compass to vary the points of engagement of said frictional means with said counters.

3. In combination, a compass, a shaft, means for rotating the shaft with a speed proportionate to the speed of a moving object, counters for indicating the speeds of the object in two directions at right angles to one another, turn-tables rotated by said shaft, wheels engaging said turn-tables, shafts at right angles to one another upon which said wheels are mounted, said shafts being slidable in their longitudinal direction, counters operated by said shafts, and means operated by the motion of said compass for sliding said shafts longitudinally.

4. In combination, a compass, a shaft, means for rotating the shaft with a speed proportionate to the speed of a moving object, counters for indicating the speeds of the object in two directions at right angles to one another, turn-tables rotated by said shaft, wheels engaging said turn-tables, shafts at right angles to one another upon which said wheels are mounted, said shafts being slidable in their longitudinal direction, counters operated by said shafts, slotted arms at the ends of said shafts, and a pin rotated with said compass and passing through both of said slotted arms.

In testimony whereof we have hereunto set our hands in the presence of two subscribing witnesses:

HENRY M. JENSEN.
HOWARD H. J. BENSON.
JOHN W. LEWIS.

Witnesses to the signatures of Jensen and Benson:
FRANCIS G. MARSH,
W. L. LIND.

Witnesses to the signature of John W. Lewis:
FRANCIS M. WRIGHT,
G. M. BALL.